United States Patent
Wu et al.

(10) Patent No.: US 9,319,696 B2
(45) Date of Patent: Apr. 19, 2016

(54) BIT RATE STREAM SWITCHING

(75) Inventors: Chung-Ping Wu, Sunnyvale, CA (US); Christian Kaiser, San Jose, CA (US); Yung-Hsiao Lai, Fremont, CA (US); James Mitch Zollinger, San Jose, CA (US); David Randall Ronca, Campbell, CA (US)

(73) Assignee: Netflix, Inc., Los Gatos, CA (US)

( * ) Notice: Subject to any disclaimer, the term of this patent is extended or adjusted under 35 U.S.C. 154(b) by 67 days.

(21) Appl. No.: 13/542,355

(22) Filed: Jul. 5, 2012

(65) Prior Publication Data

US 2012/0278449 A1 Nov. 1, 2012

Related U.S. Application Data

(63) Continuation of application No. 12/642,529, filed on Dec. 18, 2009.

(60) Provisional application No. 61/140,032, filed on Dec. 22, 2008, provisional application No. 61/164,327, filed on Mar. 27, 2009.

(51) Int. Cl.
| | |
|---|---|
| H04N 7/12 | (2006.01) |
| H04N 19/167 | (2014.01) |
| H04N 21/2368 | (2011.01) |
| H04N 21/234 | (2011.01) |
| H04N 21/236 | (2011.01) |
| H04N 21/262 | (2011.01) |
| H04N 21/44 | (2011.01) |
| H04N 21/4402 | (2011.01) |
| H04N 21/462 | (2011.01) |
| H04N 19/115 | (2014.01) |
| H04N 19/61 | (2014.01) |

(Continued)

(52) U.S. Cl.
CPC ............ *H04N 19/167* (2014.11); *H04L 65/607* (2013.01); *H04N 19/115* (2014.11); *H04N 19/164* (2014.11); *H04N 19/177* (2014.11); *H04N 19/46* (2014.11); *H04N 19/61* (2014.11); *H04N 21/2368* (2013.01); *H04N 21/23424* (2013.01); *H04N 21/23439* (2013.01); *H04N 21/23611* (2013.01); *H04N 21/2662* (2013.01); *H04N 21/26258* (2013.01); *H04N 21/4325* (2013.01); *H04N 21/4346* (2013.01); *H04N 21/44016* (2013.01); *H04N 21/44029* (2013.01); *H04N 21/4621* (2013.01)

(58) Field of Classification Search
USPC ...................................................... 375/240.01
See application file for complete search history.

(56) References Cited

U.S. PATENT DOCUMENTS

| | | |
|---|---|---|
| 5,608,732 A | 3/1997 | Bestler et al. |
| 5,907,363 A | 5/1999 | Botsford, III et al. |

(Continued)

OTHER PUBLICATIONS

The International Search Report and Written Opinion of International Application PCT/US2009/069071 dated Mar. 1, 2010.

(Continued)

*Primary Examiner* — Tracy Li
(74) *Attorney, Agent, or Firm* — Artegis Law Group, LLP

(57) ABSTRACT

Embodiments for changing bit rates in streaming media are provided. As portions of a streaming media file are downloaded for playback, the size of the portion is compared with an expected size determined prior to initiating playback of streaming AV data. The portion of the media file may be padded such that the size of the portion matches the size specified prior to initiating playback of streaming AV data.

31 Claims, 8 Drawing Sheets

(51) Int. Cl.

| | | |
|---|---|---|
| *H04N 19/164* | (2014.01) | |
| *H04N 19/177* | (2014.01) | |
| *H04N 19/46* | (2014.01) | |
| *H04L 29/06* | (2006.01) | |
| *H04N 21/2343* | (2011.01) | |
| *H04N 21/2662* | (2011.01) | |
| *H04N 21/432* | (2011.01) | |
| *H04N 21/434* | (2011.01) | |

(56) References Cited

U.S. PATENT DOCUMENTS

| | | | |
|---|---|---|---|
| 6,438,630 | B1 | 8/2002 | DeMoney |
| 6,453,114 | B2 | 9/2002 | Schultz et al. |
| 6,678,332 | B1 | 1/2004 | Gardere et al. |
| 6,738,427 | B2 | 5/2004 | Zetts |
| 6,907,081 | B2 | 6/2005 | Mantchala et al. |
| 6,967,910 | B2 | 11/2005 | Yamamoto |
| 6,993,081 | B1 | 1/2006 | Brunheroto et al. |
| 7,096,481 | B1 | 8/2006 | Forecast et al. |
| 7,212,726 | B2 | 5/2007 | Zetts |
| 7,234,007 | B2 | 6/2007 | Castellano et al. |
| 7,263,129 | B2 | 8/2007 | Kawa et al. |
| 7,818,444 | B2 | 10/2010 | Brueck et al. |
| 2001/0013123 | A1 | 8/2001 | Freeman et al. |
| 2003/0016702 | A1* | 1/2003 | Bender et al. ............. 370/522 |
| 2003/0067872 | A1 | 4/2003 | Harrell et al. |
| 2004/0031054 | A1* | 2/2004 | Dankworth et al. ........... 725/86 |
| 2005/0036557 | A1 | 2/2005 | Balakrishnan et al. |
| 2005/0100094 | A1 | 5/2005 | Keesman |
| 2005/0114909 | A1 | 5/2005 | Mercier |
| 2005/0123274 | A1 | 6/2005 | Crinon et al. |
| 2006/0026294 | A1 | 2/2006 | Virdi et al. |
| 2006/0155563 | A1* | 7/2006 | Banerjee et al. ................ 705/1 |
| 2007/0053446 | A1 | 3/2007 | Spilo |
| 2007/0121678 | A1 | 5/2007 | Brooks et al. |
| 2007/0211718 | A1* | 9/2007 | Kang et al. .................... 370/389 |
| 2008/0005676 | A1 | 1/2008 | Evans et al. |
| 2008/0043587 | A1 | 2/2008 | Gandolph et al. |
| 2008/0062322 | A1 | 3/2008 | Dey et al. |
| 2008/0086570 | A1 | 4/2008 | Dey et al. |
| 2008/0225953 | A1 | 9/2008 | Ratakonda et al. |
| 2008/0259799 | A1 | 10/2008 | van Beek |
| 2009/0003603 | A1* | 1/2009 | Wessel et al. ................ 380/255 |
| 2009/0083279 | A1 | 3/2009 | Hasek |
| 2009/0116551 | A1 | 5/2009 | Nilsson et al. |
| 2010/0022789 | A1 | 1/2010 | Mignani et al. |
| 2010/0036863 | A1* | 2/2010 | Koifman et al. ............. 707/101 |
| 2010/0158101 | A1 | 6/2010 | Wu et al. |
| 2010/0161825 | A1 | 6/2010 | Ronca et al. |
| 2010/0180044 | A1 | 7/2010 | Olsson et al. |
| 2011/0023076 | A1 | 1/2011 | Park et al. |

OTHER PUBLICATIONS

The International Search Report and Written Opinion of International Application PCT/US2009/069068 dated Feb. 23, 2010.

The International Search Report and Written Opinion of International Applicaton PCT/US2010/043114 dated Sep. 13, 2010.

The International Search Report and Written Opinion of International Application PCT/US2010/043103 dated Sep. 10, 2010.

\* cited by examiner

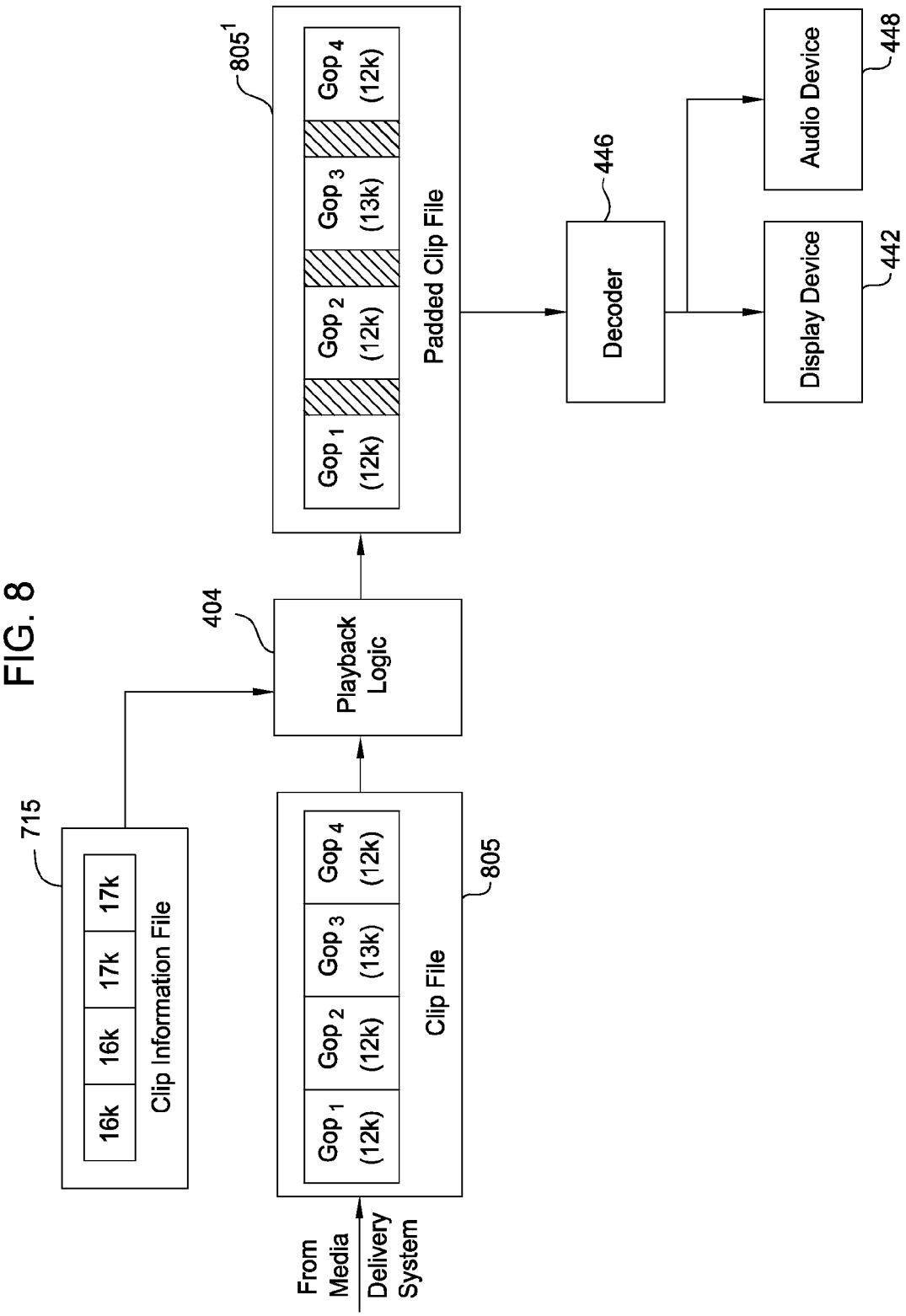

BIT RATE STREAM SWITCHING

CROSS REFERENCE TO RELATED APPLICATION

This application is a continuation of co-pending U.S. patent application Ser. No. 12/642,529, filed Dec. 18, 2009, which itself claims priority to (i) provisional patent application titled "Seamless Bit Rate Stream Switching" filed on Dec. 22, 2008, having Ser. No. 61/140,032 and (ii) provisional patent application titled "Seamless Bit Rate Stream Switching" filed on Mar. 27, 2009, having Ser. No. 61/164,327. Each of these related applications is incorporated by reference in its entirety.

BACKGROUND OF THE INVENTION

1. Field of the Invention

Embodiments of the present invention generally relate to playing streaming digital media such as digital video or digital audio. More specifically, embodiments of the present invention relate to bit rate stream switching on networked client devices.

2. Description of the Related Art

Digital content distribution systems typically include a content server, a content player, and a communications network connecting the content server to the content player. The content server is configured to store digital content files available for download from the content server to the content player. The digital content files correspond to, e.g., movies, televisions shows, sporting events, music productions, etc. The digital content file typically provides sequential content data, organized according to playback chronology, including audio data and/or video data.

The content player (e.g., a Blu-ray® disc player) is configured to download and play a digital content file, in response to a user request. The process of playing the digital content file includes decoding and rendering audio and video data to generate audio and video signals sent to audio speakers and a display screen. Playback typically involves a technique known as "streaming," where the content server transmits digital content to the content player, which plays the digital content file while content data is being received. To account for variable latency and bandwidth within the communications network, a content buffer queues the incoming content data ahead of the content data actually being played. During moments of network congestion, which leads to lower available bandwidth, less content data is added to the content buffer, which may drain down as content data is being de-queued to support playback at a certain playback bit rate. However, during moments of high network bandwidth, the content buffer is replenished and additional buffer time is added until the content buffer is generally full again. In practical systems, the content buffer may queue content data corresponding to a time span ranging from seconds to more than a minute.

Streaming digitally encoded audiovisual (AV) programs over the Internet including feature length films and television programs has become increasingly popular as the availability of high-bandwidth Internet communication has increased. AV programs are digitally encoded using a compression algorithm executed by a coder-decoder unit or codec. The visual and auditory quality of a program, when played by the content player, depends significantly on the bit rate at which the program is encoded by a codec. In digital audio and video applications, bit rate refers to the number of data bits used per unit of playback time to represent audio and video. In general, the higher the bit rate the higher the visual and auditory quality of a program and the longer it takes to download a portion of the program over a data network at a fixed bandwidth or transmission rate. In practice, each digital content file stored on the content server may be encoded using a variety of different bit rates. That is, the content server may encode the same media title using a variety of bit rates (and encoding schemes). Prior to initiating playback, the content player may measure available bandwidth from the content server and select a digital content file having a bit rate that can be supported by the measured available bandwidth. To maximize playback quality, the content player may select to stream the digital content file with the highest bit rate that does not exceed the measured bandwidth.

SUMMARY OF THE INVENTION

One embodiment of the present invention includes a method for seamlessly switching a bit rate at which audiovisual data is streamed over a data communications network from a media delivery system to a client device. The method may generally include, prior to initiating playback of the audiovisual data, configuring a decoder on the client device to decode and playback a plurality of portions of the audiovisual data. Each portion of audiovisual data may be specified as having a size corresponding to an encoding of the portion at a first bit rate. The method may further include receiving, over the data communications network, a first portion of the audiovisual data. The first portion of audiovisual data may be encoded at a second bit rate, different from first bit rate specified for the first portion. The method may further include padding the first portion of the audiovisual data such that the size of the first portion of the audiovisual data matches the specified size corresponding to the encoding of the portion of the audiovisual data encoded at the first bit rate.

In particular embodiments, configuring the decoder may include receiving a plurality of file headers, each associated with one of the encodings of the audiovisual data. For example, a file header associated with the encodings of the audiovisual data at the first and second bit rates may be received. Each file header may specify a size for each portion of audiovisual data present in the corresponding encoding. Configuring the decoder may also include generating, from the plurality of file headers, a playlist information file describing one or more clip information files. In turn, each clip information file may describe one of the portions of audiovisual data to be streamed from the media delivery system. For example, each clip information file may store an indication of the largest encoded size for each sequential portions of the audiovisual data, as specified by the plurality header files. Additionally, each clip information file may indicate a sequence of one or more groups of pictures (GOPs) in the portion of the audiovisual data corresponding to a respective clip information file. Further, the step of padding the first portion of the audiovisual data may include padding at least one GOP in the portion of the audiovisual data such that the size of each GOP matches the size specified in the respective clip information file.

Other embodiments include, without limitation, a computer-readable medium that includes instructions that enable a processing unit to implement one or more aspects of the disclosed methods as well as a system configured to implement one or more aspects of the disclosed methods.

BRIEF DESCRIPTION OF THE DRAWINGS

So that the manner in which the above recited features of the present invention may be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 8 illustrates an example of groups of pictures (GOPs) in a clip file being padded to match a GOP size indicated in a corresponding clip information file, according to one embodiment of the invention.

DETAILED DESCRIPTION

Figure 1:
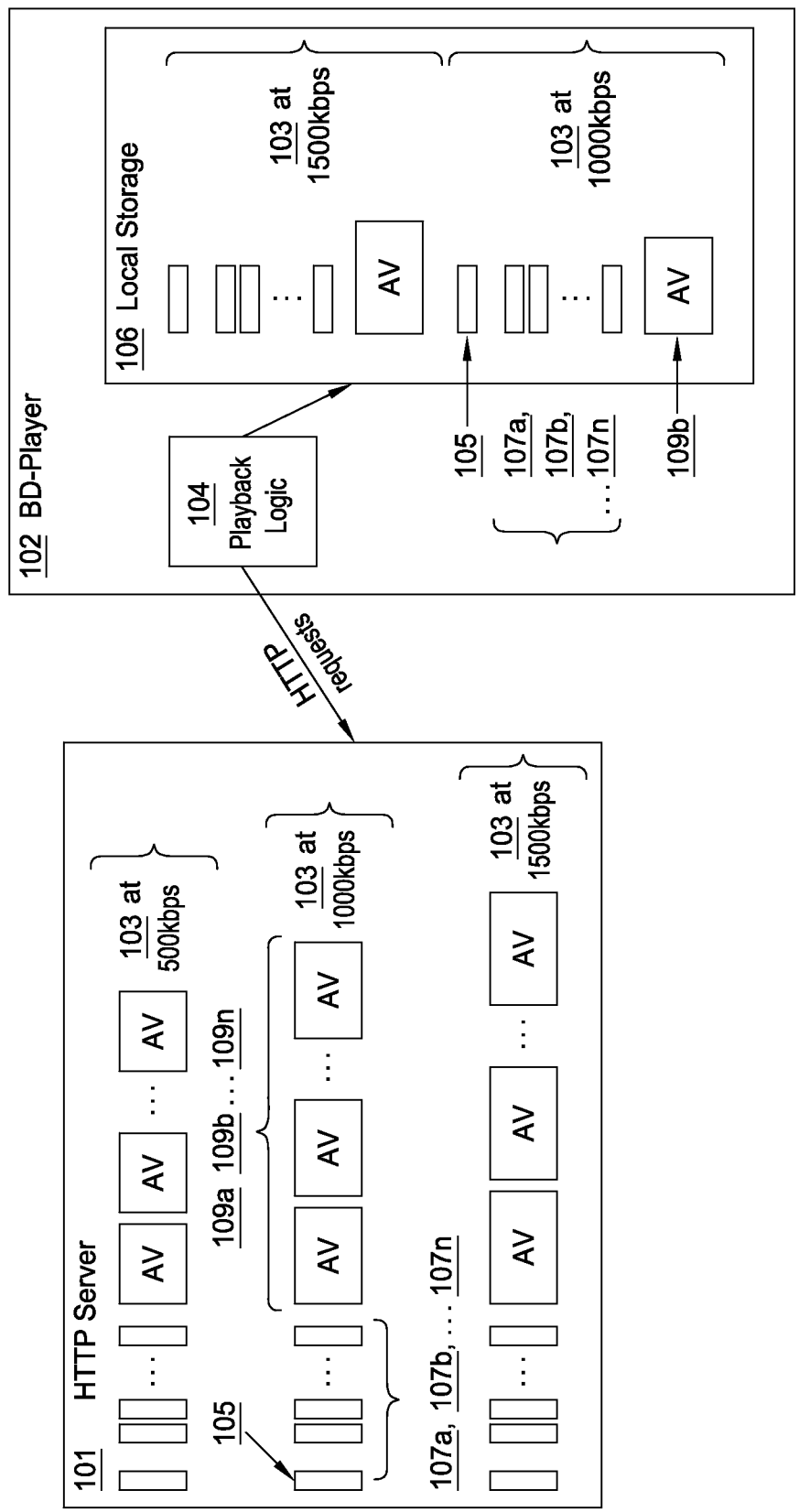
FIG. 1 illustrates switching bit rates in a Blu-Ray® disc player according to the specification published by the Blu-Ray Disc Association.

Embodiments of the invention provide an improved playback experience for media content streamed over a communications network to a networked client device, such as a set-top box, PC, mobile telephone, video gaming platform, or Blu-ray® Disc Player. More specifically, embodiments of the invention provide for adjusting streaming media bit rates during playback of an AV program without disrupting the streaming of the AV program to the user. During playback of AV programs downloaded over a data network, bandwidth may periodically change. Thus, it becomes desirable to seamlessly switch between audio and video streams of varying bit rates, e.g., to reduce the streaming bit rate when prevailing network bandwidth deteriorates. Seamless bit rate stream switching during playback balances a viewer's desire for a high quality viewing experience and efficient use of the available network bandwidth of the network connection over which AV programs are downloaded. For example, the first few seconds of a program sent over a network to a digital media player after the viewer initiates playback may be digitally encoded at a low bit rate so as to reduce the transmission time of program content over the network and hence minimize the delay between initiating playback and presenting content to the viewer. Thereafter, as playback continues, the bit rate of encoded content sent to the digital media player may be increased to take advantage of available network bandwidth and to present the highest quality audiovisual content to the viewer.

However, certain prevalent techniques for switching bit rates in some digital media players are awkward and result in significant degradation in the viewer's viewing experience. For example, the Blu-ray® Disc Association (BDA), an industry consortium responsible for establishing format standards for Blu-ray® disc technology, has established standards known collectively as the "Blu-ray® Disc Format Specifications" that include the "Blu-ray® Disc Read-Only Memory (ROM) Format," the "Blu-ray® Disc recordable Format," and the "Blu-ray® Disc Rewritable Format." For ease of reference, these specifications are referred to herein as a collection as the "Blu-ray® specification."

The Blu-ray® specification includes specifications for a Blu-ray® Disc Player (BD-Player) to playback digitally encoded AV programs downloaded over a data network such as the Internet. According to the Blu-ray® specification, portions of an AV program that are downloaded to a BD-Player may be stored in a local storage of the BD-Player as one or more AV stream files subsequently delivered to the decoder of the BD-Player as a stream of AV data for playback. Effectively, the downloaded AV program is presented to the decoder as a virtual Blu-ray® disc. However, the Blu-ray® specification requires configuring the decoder of the BD-Player with a size and a time length of all portions of an AV program contained in the AV stream files before playback of the AV program can begin. Thus, switching bit rates during playback of an AV program requires that the decoder of the BD-Player be reconfigured because the size or number of portions of the AV program changes when the bit rate is switched. Reconfiguring the decoder during playback is not an optimal solution for achieving bit rate switching because reconfiguring the decoder often noticeably disrupts an otherwise smooth presentation of audio and video. Other protocols for streaming AV content over data networks may have similar requirements for configuring size or length of portions of an AV program prior to content streaming and playback.

Note however, although a particular embodiment of the invention is described using a BD-Player which implements the Blu-ray® specifications as an example of a client device, it should be understood that embodiments of the invention may be adapted to for a broad variety of streaming media protocols. Accordingly, references to the Blu-ray® specifications or a BD-Player are made as an illustrative example and not intended to be limiting of the present invention. Further, in the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

FIG. 1 illustrates switching bit rates in a Blu-ray Disc Player according to a specification authored by the Blu-ray Disc Association. As shown, a HyperText Transfer Protocol (HTTP) server 101 is coupled to a Blu-ray Disc Player 102 via a data communications network, such as the Internet. In the example, server 101 stores files of AV program 103 that contain AV data configured to be streamed to the decoder of a BD-Player at three different bit rates: 500 kilobits per second (kbps), 1000 kbps, and 1500 kbps. The files stored for each bit rate include a playlist information file, one or more AV stream files (or clip files), and one or more clip information files. Each clip information file corresponds to one of the AV stream files. For example, the files stored for AV program 103 at 1000 kbps include playlist information file 105, clip information files 107a-n, and corresponding AV stream files 109a-n.

The playlist information file for an AV program, such as playlist information file 105 for AV program 103 at 1000 kbps, specifies a collection of playing intervals within one or more AV stream files. In an alternative embodiment, rather than store the playlist information file 105 on server 101, the playlist information file 105 may be generated by the BD-player 102 using information describing the encodings 103 (e.g., using a file header associated with each collection of AV stream files 109a-n). A collection of playing intervals defined in a playlist information file, when played back sequentially by a BD-Player, can be used to present, for example, a feature length file or television program to a viewer. In one embodiment, a playing interval represents approximately 2 to 20 seconds of playback. Each playing interval is identified in the playlist information file with reference to an IN-point and an OUT-point position on a time axis of an AV stream file. The IN-point indicates the starting point of a playing interval and the OUT-point indicates the ending point of the playing interval. Each AV stream file referenced in a playlist information file, together with its associated clip information file, is considered by the Blu-ray® specification to be one data object referred to as a "clip." Each AV stream file stores a transport stream contained in a data structure compliant with the Blu-ray® specification.

Each AV stream file has a corresponding clip information file that stores the byte location of the access points into the corresponding AV stream file that are referenced in the playlist information file. During playback of an AV program, and in particular, during playback of a portion of the AV program that corresponds to a playing interval defined in the playlist information file, the BD-Player reads the clip information file to find out the position where it should begin to read data from the AV stream file corresponding to the playing interval.

As shown, BD-Player 102 includes playback logic 104 and local storage 106. The Blu-ray specification standard provides specifications for playback logic 104 to download and write files to local storage 106 including playlist information files, clip information files, and AV stream files. In effect, the Blu-ray specification standard allows playback logic 104 to use local storage 106 to create a virtual Blu-ray Disc that includes AV program content downloaded from a server over a network. To create such a virtual Blu-ray Disc using local storage 106, playback logic 104 must store playlist information files, clip information files, and AV stream files in accordance with the Blu-ray® specification.

In particular, according to the Blu-ray specification, playback of an AV program (e.g., AV program 103) cannot start until the corresponding playlist information file (e.g., playlist information file 105), all corresponding clip information files (e.g., clip information files 107a-n), and at least one AV stream file (e.g., AV stream file 109a) are completely downloaded to local storage 106. Once these files are present in local storage 106, playback logic 104 can cause BD-Player 102 to begin playback of the AV program. After playback starts, playback logic 104 can continue to cause BD-Player 102 to download the remaining AV stream files (e.g., AV stream files 109b-n). So long as the next AV stream file needed at BD-Player 102 is completely downloaded to local storage 106 before the BD-Player has finished playing the current AV stream file, playback of an AV program will be presented to the viewer without any momentary stops or flickers or other playback events that cause a noticeable interruption of smooth audio and video playback.

However, as discussed above, it may be desirable to switch bit rates during playback of an AV program. For example, if BD-Player 102 is connected to HTTP server 101 through a typical home Digital Subscriber Line (DSL) or cable modem which can download data at approximately 1500 kbps, concurrent usage of the home DSL or cable modem, for example, by another family member, can cause BD-Player 102 to fall behind in downloading AV stream files from server 101. That is, BD-Player 102 can no longer download AV stream files from server 101 as fast as the rate at which the AV stream files are being streamed to the decoder of the BD-Player. In such a case, it would be useful to be able to seamlessly switch, for example, from playing AV stream files at 1500 kbps to playing AV stream files at 1000 kbps.

Unfortunately, to switch bit rates according to the Blu-ray specification, the playlist information file, all the clip information files, and at least one AV stream file for the new bit rate must be completely downloaded to local storage 106 before playback of the AV program at the new bit rate can begin. For example, to switch from playback of AV program 103 at 1500 kbps to playback of AV program 103 at 1000 kbps, playlist information file 105, clip information files 107a-n, and at least one AV stream file 109a-n must be completely downloaded to local storage 106 before BD-Player 102 can switch to playback of AV program 103 at 1000 kbps. If the streaming bit rate were switched during playback of AV program 103 encoded at 1500 kbps, visible interruptions may occur as switching to a different playlist information file is not seamless for media processed according to the Blu-Ray® specification. Instead, switching to a different playlist information file results in a visible interruption in viewing a program that may last several seconds, causing a poor user experience.

In one embodiment, a BD-Player may be configured with additional playback logic to allow for seamless bit rate switching during playback, without requiring the BD-Player to be reconfigured with changed size data and without causing a noticeable interruption of smooth audio and video playback. In particular, as clip files are downloaded for playback, the size of the clip file (or the size of groups of pictures (GOPs) in the clip file) is compared with a clip information file. The clip information file may be used to configure the BD-Player prior to initiating playback of streaming AV data. The playback logic may pad the clip file (or one or more GOPs in the clip file) such that the size of the clip file matches the configured size specified in the clip information file.

Thus, the decoder of a BD-Player may be configured to process audiovisual data of an AV program at a first bit rate. And during playback of the AV program, portions of the AV program, encoded at a second bit rate may be downloaded to the BD-Player from a server over a data network. The downloaded portions are stored in a memory of the BD-Player as one or more AV stream files. Each stored AV stream file may include data downloaded from the server and additionally include padding data in an amount allowing the decoder to process the stored AV stream file at the first bit rate.

Storing AV stream files with an appropriate amount of padding data after downloading a portion of an AV program and before the portion is streamed to the decoder enables downloading portions of an AV program configured to be processed at varying bit rates to effectively utilize available network bandwidth and enables seamlessly switching the bit rate of the stream of AV data delivered to the decoder without causing a noticeable interruption of smooth audio and video playback. That is, the padding techniques described herein may be applied in a BD-Player to seamlessly achieve adaptive streaming. In particular, a noticeable interruption of smooth audio and video playback caused by a temporary decrease in available network bandwidth may be avoided by detecting the temporary decrease in bandwidth at the BD-Player and thereafter seamlessly switching to playback of content configured to be processed at a lower bit rate while the temporary decrease persists and seamlessly returning to playback of content configured to be processed at the original higher bit rate upon detecting that the temporary decrease has subsided.

Figure 2:
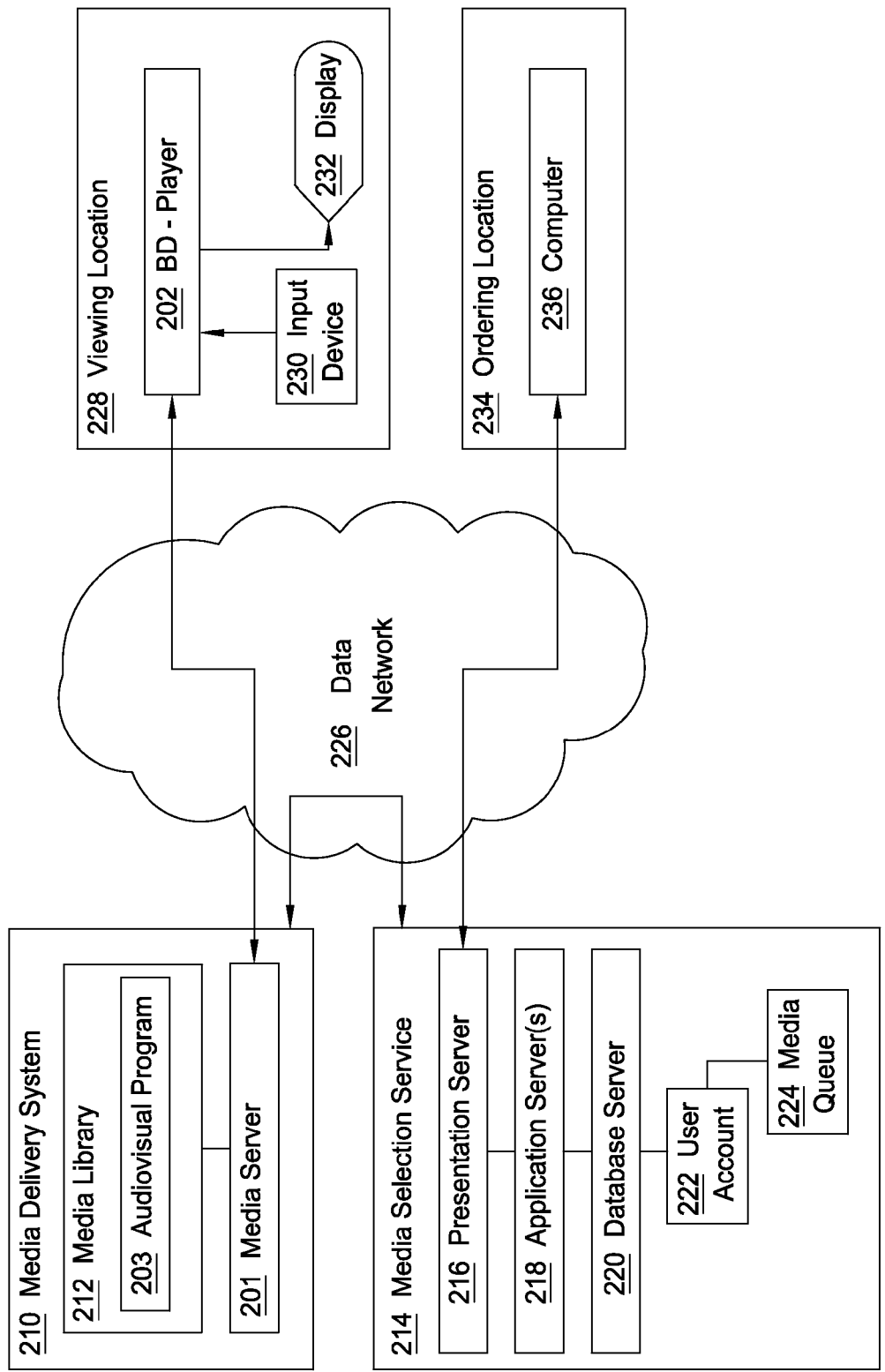
FIG. 2 illustrates an example networked computing environment which includes a media delivery system streaming content to a networked client device, according to one embodiment of the invention.

FIG. 2 illustrates an example networked computing environment which includes a media delivery system 210 streaming content to a networked client device, according to one embodiment of the invention. As shown, FIG. 2 illustrates a media delivery system 210, media selection service 214, viewing location 228, and ordering location 234. In one embodiment, the media server 201, presentation server 216 of media selection service 214, BD-Player 202, and computer 236 are all connected to data network 226. The data network 226 is included to be representative of any combination of computer networks capable of delivering data from one computer to another. For example, data network 226 may comprise any combination of a local area network ("LAN"), a wide area network ("WAN"), the Internet, a telecommunications network, a satellite network, a cable television network, or a wireless network. Further, data network 226 itself include one or more networks coupled together to form a single logical network and that supports appropriate network protocols (e.g., TCP/IP for the Internet).

Illustratively, media delivery system 210 includes a media library 212 that comprises AV programs 203. The term "audiovisual program" or "AV program" as used herein refers broadly to any audio, video, or audiovisual information that can be delivered using a streaming media protocol over a data network. Examples of AV programs include music, recordings of spoken words, movies, sports programs, television series episodes, documentary motion pictures, instructional programs, or any other form of program. AV program 203 comprises a stored set of files that can be delivered on demand over a network connection to a computer such as BD-Player 202. In a practical embodiment, there may be thousands of AV programs stored in or managed by the media delivery system 210. AV programs 203 may include multiple encodings of a given title, where each encoding is made at a different bit-rate. Further, in one embodiment, the AV programs 203 may include separate audio and video streams for one or more titles. In such a case, when a user requests a particular title, the audio and video streams may be multiplexed together in order to be streamed to the user.

As shown, media delivery system 210 also includes media server 201 coupled to the media library 212. Media server 201 generally is configured to retrieve a selected or specified file or files that comprise an AV program 203 from the media library 212 in response to a request from BD-Player 202 and deliver the files using a streaming media protocol to the BD-Player 202 in response to the request. In one embodiment, media server 201 is configured to deliver files stored in media library 212 using the HyperText Transfer Protocol (HTTP) and/or HTTP over Secure Socket Layer (HTTPS) through data network 226 to BD-Player 202. However, embodiments are not limited to any particular network protocol and any suitable network protocol may be used to deliver AV program content from media delivery system 210 to BD-Player.

Also as shown, media selection service 214 includes a presentation server 216, one or more application servers 218, and a database server 220. The media selection service 214 may be integrated into or co-located with the media delivery system 210 as a single system, and the media delivery system 210 may be implemented as an application on the application servers 218 or otherwise contained within the media selection service 214. In the media selection service 214, the one or more application servers 218 are coupled to the presentation server 216 and database server 220.

The database server 220 maintains a user account 222 for a user of the service including a media queue 224. The user account 222 is associated with a user at the ordering location 234 and the viewing location 228. The database server 220 is configured with an inventory of audiovisual programs that are available for delivery using the media delivery system 210. Application servers 218 and database server 220 is coupled through network 226 to media server 201 and other elements of media delivery system 210 (not shown), to enable the media delivery system 210 to determine which AV programs 203 are in media queue 224 for delivery to the viewing location 228. The presentation server 216 is configured with programs for generating a user interface display, receiving user input selecting audiovisual programs for rental or viewing, and other functions.

The media queue 224 may provide a list of AV programs 203 that a particular user or user account has rented or requested to download or view. The queue 224 may include a list of both tangible media for rental, such as DVD titles, and AV programs 2063 for instant watching (i.e., streaming) or for downloading. Media queue 224 also may represent multiple associated queues, so that the service 214 may maintain one queue of tangible media for rental and a separate but associated queue of audiovisual programs for instant watching or downloading. Further, one user account 222 may be associated with multiple user profiles each having a separate queue in any of the foregoing queue arrangements. In one embodiment, the media selection service 214 is the Netflix® service commercially available from Netflix, Inc., Los Gatos, Calif.

Illustratively, viewing location 228 includes the BD-Player 202, an input device 230, and a display 232. For purposes of illustrating a clear example, FIG. 2 shows one viewing location 228, but in a practical embodiment there may be at least many thousands of viewing locations concurrently served by one or more media delivery systems 210.

BD-Player 202 includes any digital media player that complies with one or more of the video based player profiles specified in the Blu-ray® specification. At present the Blu-ray specification includes three video based player profiles known as "Profile 1.0", "Profile 1.1", and "Profile 2.0" ("Profile 2.0" is referred to commercially as "BD-Live"). However, embodiments are not limited to digital media players that implement existing versions of the Blu-ray specification and include digital media players that implement any future version of the Blu-ray specification—or other protocols for streaming media to a networked client device. In addition, BD-Player 202 may implement some or all portions of the Advanced Access Content System (AACS) standard for secure content distribution and digital rights management.

In one embodiment, BD-Player 202 is a computer system configured as a set-top box coupled to data network 226 and configured to receive AV programs 203 and generate corresponding video output for a display 232 at viewing location 228. Non-limiting examples of set-top boxes include Blu-ray Disc player devices, streaming video playback boxes such as the Netflix Player by Roku, digital satellite television set-top boxes, video game consoles, digital video recorder (DVR) devices, cable converter boxes, or a set-top box device configured to support one or more video player profiles of the Blu-ray® specifications. In another embodiment, BD-Player 202 is a desktop or workstation computer system configured coupled to data network 226 and configured with a digital media player application that implements one or more video player profiles of the Blu-ray® specifications (or other streaming media protocols) and that is configured to receive AV programs 203 and generate corresponding video output for a display 232 at the viewing location 228.

Input device 230 is any user input device suitable for controlling the operation of BD-Player 202. In an embodiment, input device 230 is a remote control device that uses infrared light-emitting diode emissions, radio-frequency signals, or wired signals to communicate with player 202 and input device 230 comprises one or more control buttons for operating functions of the player 202. For example, input device comprises a play button, a fast forward button, a rewind button, and a selection button. In another embodiment, input device 230 is an alphanumeric keyboard and mouse combination of the kind commonly connected to a personal computer or workstation computer Display 232 is any display device capable of displaying motion picture or video images according NTSC, PAL, ATSC, or other standards for conventional video, HD video, or other format. In an embodiment, display 232 comprises a television monitor or other similar suitable video display.

Ordering location 234 may provide a computer 236 that can connect to presentation server 216 through data network 226. For purposes of illustrating a clear example, FIG. 1 shows one ordering location 234, but in a practical embodiment there may be many thousands of ordering locations concurrently served by one or more media selection services 214. In an embodiment, computer 236 is configured with a browser or other interface program that can connect to a complementary web server or other server program to interact with functions provided by media selection service 214. The ordering location 234 and the viewing location 228 may be the same location or different locations in various embodiments. Further, the functionality of computer 236 may be included in BD-Player 202. For example, BD-Player 202 may be configured with a browser or other user interface program that can connect to a web server or other server program to interact with functions provided by media selection service.

Figure 3:
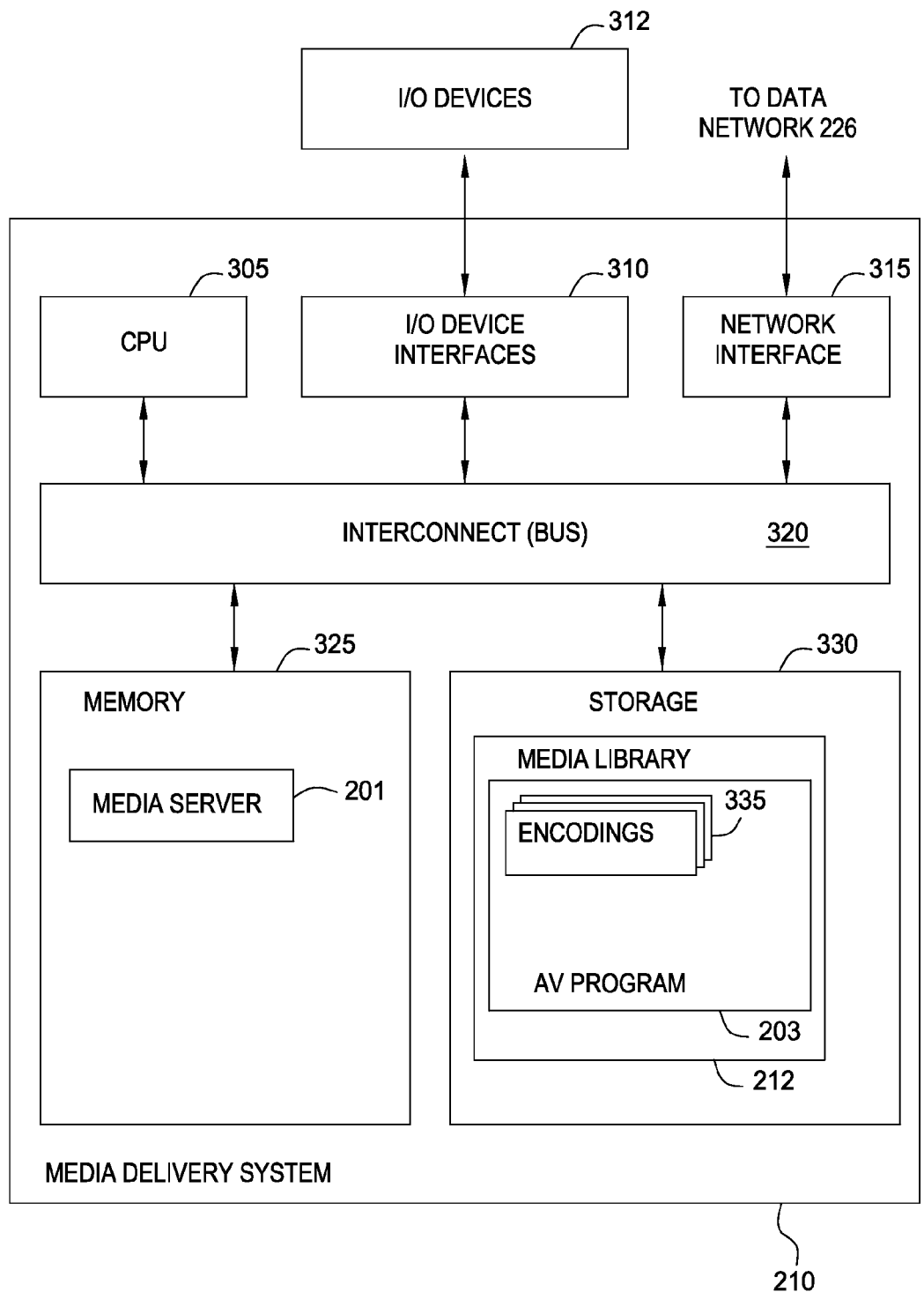
FIG. 3 further illustrates the media delivery system of FIG. 2, according to one embodiment of the invention.

FIG. 3 is a more detailed view of the media delivery system 210 of FIG. 2, according to one embodiment of the invention. As shown, media delivery system 210 includes, without limitation, a central processing unit (CPU) 305, a network interface 315, an interconnect 320, a memory 325, and storage 330. The media delivery system 210 may also include an I/O devices interface 310 connecting I/O devices 212 (e.g., keyboard, display and mouse devices) to the media delivery system 210.

The CPU 305 retrieves and executes programming instructions stored in the memory 325. Similarly, the CPU 305 stores and retrieves application data residing in the memory 325. The interconnect 320 facilitates transmission of programming instructions and application data between the CPU 305, I/O devices interface 310, storage 330, network interface 315, and memory 325. CPU 305 is included to be representative of a single CPU, multiple CPUs, a single CPU having multiple processing cores, and the like. And the memory 325 is generally included to be representative of a random access memory. The storage 330 may be a disk drive storage device. Although shown as a single unit, the storage 330 may be a combination of fixed and/or removable storage devices, such as fixed disc drives, floppy disc drives, tape drives, removable memory cards, optical storage, network attached storage (NAS), or a storage area-network (SAN).

Illustratively, the memory 225 includes the media server 201. As noted above, the media server 201 may generally be configured to stream the AV program 203 to a client device (e.g., BD-player 202) using a streaming media protocol. In one embodiment, the media server 201 may stream the AV program to the client device using one of multiple bit-rate encodings 335 available in storage 330. Each encoding 335 may provide a copy of the same general media file, encoded at a different bit rate. Further, while each encoding 335 may generally be referred to as having a bit rate using a fixed value (e.g., a bit rate of 1500 k per second) the actual bit rate may vary at different points within a given encoding 335. As is known, variable bit rate (VBR) encoding techniques adjust the bit rate of an encoding depending on the content being encoded. For example, if there is little change in a visual scene, the bit rate at which content is encoded may be decreased. Conversely, if there is rapid change in the scene, the bit rate may increase, up to the maxim specified for the encoding. VBR offers a higher audio visual quality at a smaller file size.

In one embodiment, the particular encoding 335 (and thus the bit-rate) used to stream data may be determined by the client device (or media server 201) as a function of the prevailing bandwidth conditions. For example, the client may be configured to initially request the lowest available bit rate encoding 335, and then increase the bit-rate up to the greatest rate supportable by the prevailing bandwidth between the client device and the media delivery system 210. Further, as the available bandwidth changes, the bit rate at which the AV program is streamed may be changed. In such a case, the media server 201 may change from streaming one encoding 335 to the client to another. However, rather than reconfigure the client device each time the streaming bit-rate is changed (i.e., each time the media server changes from streaming one encoding 335 to another), the client device may pad portions of the downloaded encoding 335 such that the size of a given portion matches the configured size of that portion specified to the client device prior to streaming.

For example, as described in greater detail below, each encoding 335 may provide a sequence of groups of pictures (GOPs), and a set of sequential GOPs from an encoding 335 may be grouped together to form a complete set of video data (e.g., a file storing an encoding of video data for a complete movie). Corresponding GOPs in different encodings 335 represent the same sequence of pictures which may be decoded and played back frame-by frame. Similarly, an encoding 335 may store the audio data associated with a given media title (e.g., audio encodings may store the audio for a given movie in a variety of languages). Portions of an audio encoding may correspond to a sequence of video in multiple video encodings. In one embodiment, an encoding 335 may include multiplexed audio and video data. Alternatively however, separate encodings 335 may be used to store video data (encoded at a particular bit-rate) and video data (encoded at a particular sampling frequency). In such a case, a client device may stream a video encoding and an audio data encoding from the media delivery system 210 and multiplex the streams on the client device directly.

Each encoding 335 for a given AV program 203 may also include a file header describing the particular collection of audio or video data stored in a given encoding 335. For example, in the case of video data, the file header may refer to the byte or packet offset of each GOP in the encoding 335, list the byte or packet size of each GOP in the encoding 335, and/or provide offsets for multiplexing audio with video (i.e., specify insertion points within each GOP for interleaving portions of audio data with video data) as well as specify a playing interval or duration for each GOP. However, the information stored in a given file header also be stored in a separate file. In such a case, the header for an encoding 335 may include a reference to the associated file describing the contents of that encoding 335.

In any case, the client device may retrieve the information describing each encoding 335 available for a given AV program (e.g., the file headers for encodings of the AV program at each distinct video bit rate and each available audio track). The client device may use the information describing the size and playback intervals of a given encoding to generate a playlist information file itself used to configure the client device for playback. For example, the playlist information file may subdivide the encodings into a number of clip files, and each clip file may reference a sequential set of GOPs, regardless of which encoding 335 is streamed to the client. However, as the encodings 335 are generated at different bit rates, the size (in bytes or packets, or both) of the GOPs referenced by a given clip file may vary, even though the duration or playing interval of corresponding GOPs in different encodings remains the same. By aligning playback along a GOP boundary, a client device may switch streaming playback from one encoding 335 to another without disrupting the playback (save for a change in audio/video quality resulting from the changed bit-rate). Further, by padding the GOPs to match the size used to configure the client device, visible interruptions in playback are avoided, as the client device need not switch to a different playlist information file when switching among clip files streamed from different encodings 335.

More generally, each encoding 335 may include a file header indicating the byte offset of each group of pictures (GOP) in that encoding 335. From this information, the size of each GOP may be determined. Alternatively, the file header may indicate the size of each GOP (allowing the byte offset for each GOP to be determined). Further, as noted, the playlist information file generated by the client may subdivide the AV program 203 into a sequence of clip files, each containing a number of GOPs. In one embodiment, the number of GOPs in each clip file may be constant for a given AV program 203. The client device may use data from the file headers associated with the encodings to generate a playlist information file used to configure the client device for playback. As the clip files are downloaded, the client device may compare the size of each GOP in a clip to a reference size specified in the corresponding clip information file generated prior to initiating streaming playback and pad each GOP as necessary so that the size of each GOP is the same as specified in the client information file.

Figure 4:
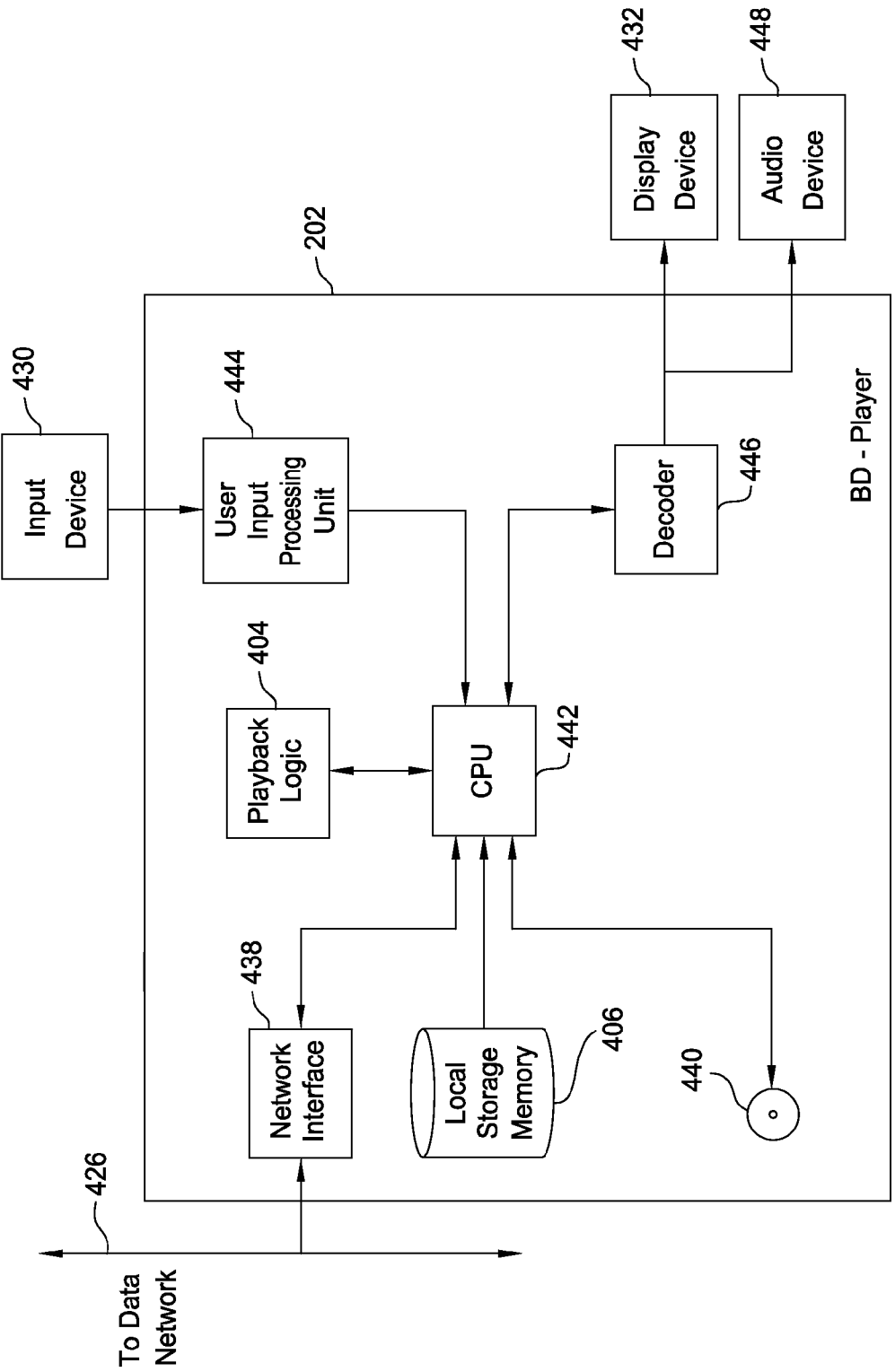
FIG. 4 further illustrates the content player of FIG. 1, according to one embodiment of the invention.

FIG. 4 further illustrates BD-Player 202 of FIG. 2 in greater detail, according to one embodiment of the invention. As shown, BD-Player 202 includes a network interface 438, local storage or memory 406, a removable media device 440, playback logic 404, CPU 442, user input processing unit 444, decoder 446, display device 432, and audio device 348.

Playback logic 404 provides one or more sequences of computer executable instructions for performing various functions that are described further herein. The instructions comprising playback logic 404 may be stored on a non-volatile memory of BD-player 202 such as, for example, a hard disk, flash memory, or firmware of BD player 202. Alternatively, instructions comprising playback logic 404 may be read by player 202 from a removable non-volatile computer-readable storage medium (e.g., a Blu-ray Disc) using removable media device 440. Still further, instructions comprising playback logic 404 may be received over data network 426 via network interface 438.

The combination of network interface 438 and data network 426 broadly represent any of the following: an Ethernet port configured to couple BD-player 202 to a router, hub, DSL modem or adapter, or cable modem; an integrated DSL modem or adapter, or cable modem; an Ethernet port configured to couple BD-player 202 to a wireless access point; and any other electronic interface to a source of audiovisual program data.

In one embodiment, playback logic 404 is an executable Blu-ray® Disc Java (BD-J) application (Xlet) that is either read from a Blu-ray Disc inserted into player 402 and/or downloaded over network 426 from media server 201. In another embodiment, logic 404 is stored in firmware of player 402, for example, in a flash ROM of player 402. In another embodiment, a bootstrap portion of logic 404 is stored in firmware of player 402 and the bootstrap portion, when executed by CPU 342, downloads an application portion of logic 404 (e.g., an BD-J Xlet) from media server 201. The application portion of logic 404, when executed by CPU 442, performs the various functions that are described further herein. CPU 442 may comprise one or more processors and/or one or more processor cores.

Local storage or memory 406 is a hard disk or flash memory for storing files; including playlist information files, clip information files, and AV stream files downloaded from media server 201 by playback logic 404.

Decoder 446 refers broadly to a collection of hardware and/or software components within BD-player 402 that takes as input a transport stream contained in one or more AV stream files stored in local storage 406 and produces as output decompressed video images and audio data for display device 432 and audio device 448. In one embodiment, decoder 446 is compatible with the model Transport Stream System Target Decoder (T-STD) described in the international standards document ISOIIEC 183818-1. In general, a transport stream is a data format for multiplexing and synchronizing the output of one or more video and audio elementary streams. In general, an elementary stream is typically the output of a video or audio encoder produced when digitally recording an audio-visual program. Example elementary video streams include video digitally encoded according to the SMPTE VC-I video stream, MPEG-4 AVC video stream, and MPEG2 video stream formats. Example elementary audio streams include audio digitally encoded according to the Linear PCM audio stream, Dolby Digital audio stream, Dolby Digital Plus audio stream, Dolby lossless audio stream, DTS digital surround audio stream, and DTS-HD audio stream formats.

Audio and video elementary streams may be divided into packets and encapsulated in one or more packets of a transport stream. By interleaving/multiplexing transport stream packets containing video data and audio data, audio and video elementary streams encoded at varying bit rates may be synchronized. For example, a transport stream may synchronize video encoded in an elementary stream at 2 Mbps with audio encoded in an elementary stream at 640 kbps. In one embodiment, the transport stream contained in an AV stream file stored in local storage 406 is a Moving Picture Experts Group-2 (MPEG-2) Transport Stream (ISO/IEe 13818-1) contained in a structure compliant with the Blu-ray specification referred to in Blu-ray specification as a "BDAV MPEG-2 Transport Stream".

Decoder 446 may include any combination of sub-components such as a buffer for queuing transport stream packets read from an AV stream file, a de-multiplexer for de-multiplexing the stream of transport stream packets into separate elementary audio and video streams, and an audio decoder and a video decoder for decompressing elementary audio and video streams respectively.

Further, decoder 446 may be configured to process a transport stream at a particular bit rate. The bit rate at which decoder 446 processes a transport stream may be indicated by the time lengths of the playing intervals (i.e., of the clips) specified in the playlist information file and the sizes of the playing intervals. In one embodiment, the size of the playing intervals may be indicated in a set of clip information files, each corresponding to a distinct clip file downloaded as part of the AV stream files contained in the transport stream. However, as noted above, when the bit rate at which the clips are downloaded changes, the bit-size of each clip may not match the size specified in the corresponding clip information file. Accordingly, in one embodiment, the playback logic may pad the playback intervals in a clip to match the bit-size specified in the corresponding clip information file.

In one embodiment, playback logic 404 may configure decoder 446 to process a transport stream at a particular bit rate by causing player 202 to store a playlist information file and a collection of clip information files identified in the playlist information file to local storage 406. Thereafter, logic 404 may initiate playback of the playlist by invoking a playback function provided by an application programming interface (API) offered by a system layer of player 402. That is, the playback logic 404 may be begin downloading the sequential clip files (corresponding to the clip information files), and once the first clip file is fully downloaded, send it to the decoder for decoding and playback on the display device 432 and audio device 448.

User input processing unit 444 processes input signals received from input device 430. An input signal processed by user input processing unit 444 may result in an event notification to a program or process executing instructions included in playback logic 404. Logic 404 may be configured to handle various types of event notifications from user input processing unit 444. For example, playback logic 404 may receive an event notification when a user uses input device 430 to initiate playback of an AV program or perform a seek function within an AV program. In response to receiving such an event notification, playback logic 404 may configure decoder 446 of player 202 to process the AV program at a particular bit rate by downloading and storing in local storage 406 the playlist information file and clip information files of the AV program.

Figure 5:
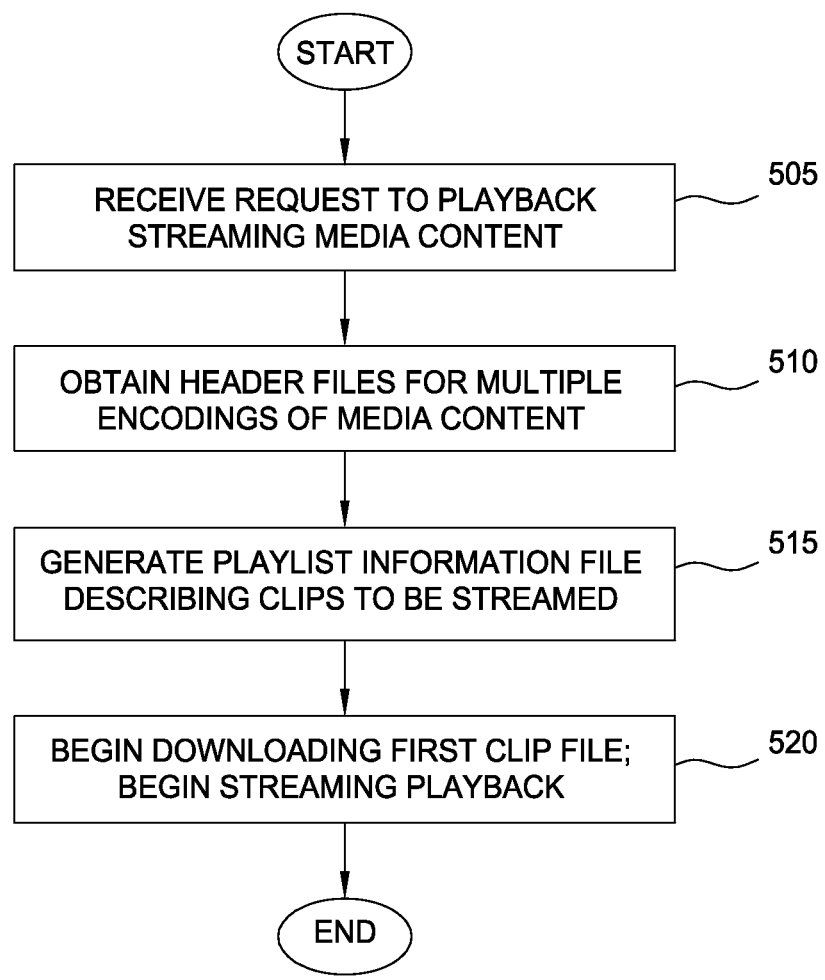
FIG. 5 illustrates a method for streaming media content to a networked client device, according to one embodiment of the invention.

FIG. 5 illustrates a method 500 for streaming media content to a networked client device, according to one embodiment of the invention. As shown, the method 500 begins at step 505, where the media delivery system receives a request to stream an AV program to a client device (e.g., to BD-player 202). As noted, prior to streaming the actual media content (e.g., an encoding 335 of FIG. 3), the device may generate a playlist information file and a collection of clip information files. Each clip information file may specify a size of a corresponding clip file to download from the server and feed to a decoder for decoding and playback. In one embodiment, the client device may be configured to download a file header from each of multiple encodings of the requested AV program (step 510) and generate the playlist information file from the GOP size information and GOP time duration information stored in each file header. As noted above, the file header for a given encoding may specify the playing interval and size of each GOP included in that encoding.

From the information obtained at step 510, the client device may generate a playlist information file used to configure the client device for playback (step 515). In one embodiment, e.g., the playlist information file may describe multiple clips (i.e., sequences of GOPs) as well as the size (in bytes or packets) of the GOPs in each clip. Once generated, the playlist information file may be used to configure the client device (e.g., a Blu-ray® disc player) for streaming media playback. As noted, the size of the clips specified in the clip information files may be determined by selecting the largest size GOP present in any of the available encodings. This process may generally be repeated to generate a clip information file for each clip file specified in the playlist. This results in clip information files which specify the largest possible size for the GOPs in the corresponding clip file. Thus, when a clip file (e.g., a sequence of GOPs) is downloaded at any particular bit rate, the GOPs in that clip file may be padded, if needed, to match the size of the clip file specified by the playlist information file used to configure the client device for playback.

Returning to the method 500 shown in FIG. 5, at step 520, after the clip information files for an AV program have been generated (and a particular encoding has been selected) the client device begins downloading the first clip file from the media delivery system. Once downloaded, streaming playback may begin. Further, as additional clip files are downloaded, the GOPs included in those clip files may be padded as needed to match the clip information files generated at step 515.

Figure 6:
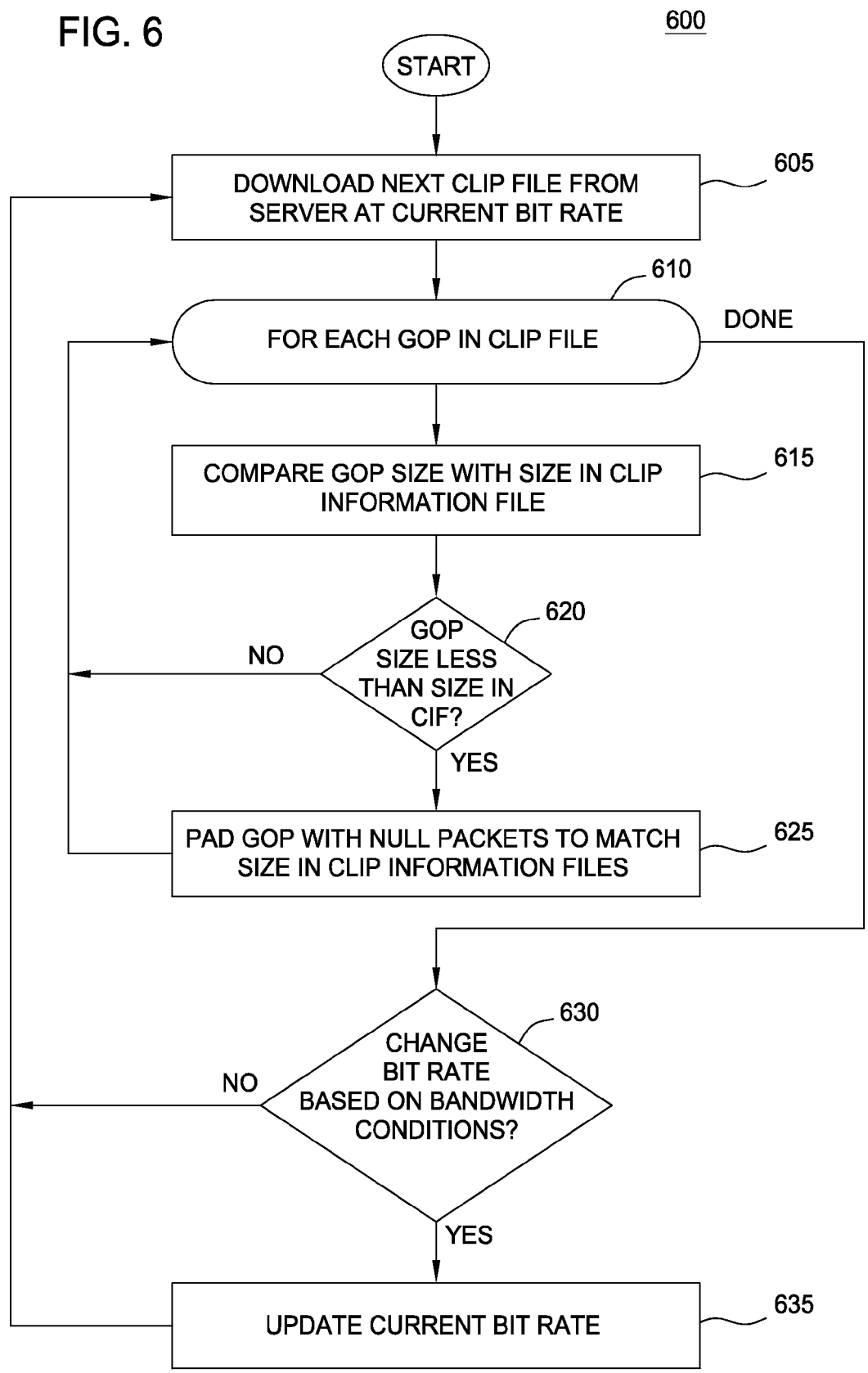
FIG. 6 illustrates a method for padding groups of pictures (GOPs) in streaming media content, according to one embodiment of the invention.

FIG. 6 illustrates a method 600 for padding groups of pictures (GOPs) in streaming media content, according to one embodiment of the invention. As shown, the method 600 begins at step 605 where a client device (e.g., BD-player 202) downloads a next clip file from a server (e.g., media delivery system 210). The clip file may be downloaded from an encoding of the AV program encoded at a then current streaming bit rate. Once downloaded, a loop begins at step 610 to evaluate each GOP in the clip file against the corresponding clip information file. At step 615, e.g., the playback logic 404 of FIG. 4 may compare the size of a GOP in the clip file with the specified size of that GOP in the clip information file. At step 620, if the size of the GOP matches what is specified in the clip information file, then no padding is required and the method returns to 610 to elevate the next GOP in the clip file. Otherwise, at step 625, the GOP is padded as necessary to match the size specified in the clip information file. For example, in the case of an MPEG-2 encoded transport stream, the playback logic 404 may pad the GOP with null packets having a packet ID of 0x1FFF. The payload of null packets do not contain any data at all needed for decoding and playing back the MPEG-2 encoded transport stream, and the decoder of the client device may be configured to ignore the packet.

At step 630, after evaluating each GOP in the clip file downloaded at step 605, the client device may determine whether to change the encoded bit rate at which the next clip file should be downloaded (i.e., to change which encoding 335 of FIG. 3 is used to stream data to the client device). For example, the client device may identify a change in prevailing bandwidth conditions that justifies increasing (or decreasing) the then current streaming bit rate. In a particular embodiment, the client device may be begin streaming playback by requesting the first clip file of an AV program using the lowest available bit rate encoding. Doing so may allow the streaming playback to begin more rapidly then by downloading a clip file encoded at a higher bit rate. However, as the prevailing bandwidth conditions allow, the client device may request clip files at progressively higher bit rate encodings—improving audio video quality.

More generally, by changing the bit rate encodings in the clip files downloaded from the media delivery system, and by padding the clip files as appropriate, the client device may seamless switch between different bit rate encodings, without having to reconfigure the client device each time the streaming bit-rate is changed. If the client device determines that a change in bit rate is appropriate, then at step 635, the current bit rate is updated. The method 600 then returns to step 605 where the client device requests the next clip file from the media delivery system. The process illustrated in FIG. 6 may generally repeat to download the complete set of clip files for a given AV program.

Figure 7:
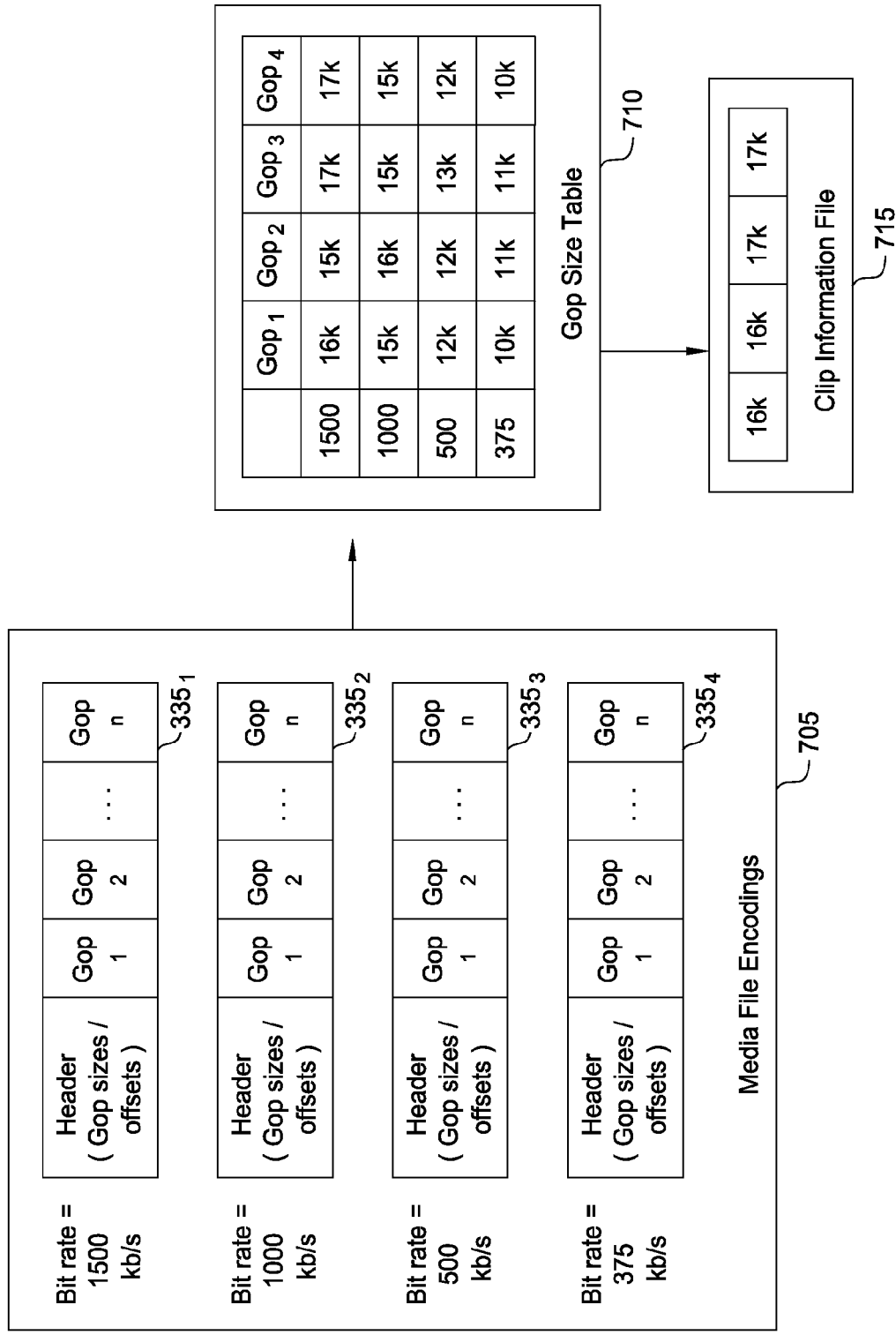
FIG. 7 illustrates an example of a clip information file generated from streaming media file headers, according to one embodiment of the invention.

FIG. 7 illustrates an example of a clip information file 715 generated from streaming media file headers, according to one embodiment of the invention. In this example, media file encodings 705 include four available encodings: one encoded at a bit rate of 1500 kbps (encoding $335_1$), one encoded at a bit rate of 1000 kbps (encoding $335_2$), one encoded at a bit rate of 500 kbps (encoding $335_3$), and one encoded at a bit rate of 375 kbps (encoding $335_4$). Each encoding $335_{1-4}$ includes a sequence of GOPs. Assume for this example, that the encodings $335_{1-4}$ provide an encoded video stream which may be multiplexed with an encoded audio stream for decoding and playback on the client device (e.g., BD-player 202).

As shown, each of the encodings $335_{1-4}$ includes a file header specifying the bit size (or offsets) of each GOP in that encoding. As described above, the client device may be configured to obtain the file header for each available encoding (e.g., encodings $335_{1-4}$). In one embodiment, the client device may store this information in a data structure, such as GOP size table 710. That is, the client device may generate a table aligning each GOP across multiple bit rates. For example, GOP size table 710 shows that GOP1 (the first group of pictures in the AV program) is 16 k bytes in size in encoding $335_1$, 15 k bytes in size in encoding $335_2$, 12 k bytes in size in encoding $335_3$, and 10 k bytes in size in encoding $335_4$. Note, however, the highest encoded bit rate does not always result in the largest GOP size. For example, table 710 shows that the size of GOP2 in encoding $335_2$ (encoded at 1000 kbps) is larger then the size of this GOP in encoding $335_1$ (encoded at 1500 kpbs). The may result form the approach taken by different bit rates in generating a variable bit rate encoding for the same media content.

Assume for this example that GOPs 1-4 correspond to a clip file, as specified by a playlist for the media file encoded by media file encodings 705. In such a case, the client device may generate the clip information file 715 from the GOP size table that includes a GOP size for GOPs 1-4. As shown, the clip information file 175 indicates a GOP size corresponding to the largest COP size in any of the available encodings 335. In this specific example, a byte size of 16 k bytes, 16 k bytes, 17 k bytes, and 17 k bytes for GOP1, GOP2, GOP3, and GOP4, respectively. Thus, when the clip file corresponding to clip information file 715 is streamed to the client device, the actual GOPs will either match the size in the clip information file 715, or may be padded as needed to do so.

This result is shown in FIG. 8, which illustrates an example of groups of pictures (GOPs) in a clip file 805 being padded to match a GOP size indicated in a corresponding clip information file 715, according to one embodiment of the invention. In this example, the client device (e.g., BD-player 202) has downloaded clip file 805 from the media delivery system using the 500 kbps encoding (i.e., encoding $335_3$ form FIG. 7). As shown, the clip file 805 includes a first GOP at 12 k bytes in size, a second GOP at 12 k bytes in size, a third GOP at 13 k bytes in size, and a fourth GOP at 12 k bytes in size. The size of each GOP in clip file 805 matches the size specified in the file of encoding $335_3$. However, each of these GOPs is smaller in size then specified in the clip information file 715. Accordingly, in one embodiment, the playback logic 404 pads each GOP in clip file 805 as necessary so that each GOP in padded clip file 805' matches the GOP size specified in clip information file 715. As shown, once the playback logic 404 has padded the GOPs in clip file 805, the resulting padded clip file 805' may be passed to decoder 446 for decoding and playback on display device 442 and audio device 448.

In sum, techniques are disclosed for providing seamless bit rate switching in streaming media bit rates, accomplished in part by padding individual portions of streamed content so as to match an expected size for each individual portion. Doing so allows, e.g., a BD-player to seamlessly change bit rates during playback, i.e., to change bit rates without requiring the BD-player to be reconfigured with changed size data or causing a noticeable interruption of smooth audio and video playback each time the streaming bit rates are changed. As clip files are downloaded for playback, the size of the clip file (or the size of GOPs in the clip file) is compared with a corresponding clip information file. The clip information file may be used to configure the BD-Player prior to initiating playback of streaming AV data. The playback logic may pad the clip file (or one or more GOPs in the clip file) such that the size of the clip file matches the configured size specified in the clip information file.

One embodiment of the invention may be implemented as a program product stored on computer-readable storage media within the client device. In this embodiment, the content client device may be embedded within a computing device such as a set top box or BD-player. An alternative embodiment may be implemented as a program product that is downloaded to a memory within a computer system, for example as executable instructions embedded within an internet web site. In this embodiment, the client device comprises the computer system.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

We claim:

1. A computer-implemented method to facilitate streaming of audiovisual data, the computer-implemented method comprising:

requesting, by a client device, at least a first streaming media header pertaining to a first encoded version of a media title to be streamed to the client device, the first encoded version of the media title containing intervals of audiovisual data, wherein the first streaming media header specifies information about the intervals, the information including: (i) a plurality of byte offsets into the first encoded version of the media title and (ii) corresponding time points in the media title; and generating, from the streaming media header and by the client device, a plurality of byte range requests, each corresponding to at least one time point of a respective one of successive intervals selected from the intervals of audiovisual data contained in the first encoded version of the media title.

2. The computer-implemented method of claim 1, wherein each interval comprises a clip, wherein the computer-implemented method further comprises:

streaming the media title to the client device by sending the requests for the successive intervals of audiovisual data to a server hosting the media title.

3. The computer-implemented method of claim 2, wherein each encoded version comprises an embodiment of the media title, that is encoded at a distinct bit rate, wherein the byte range requests are Hypertext Transfer Protocol (HTTP) byte range requests.

4. The computer-implemented method of claim 3, wherein each streaming media header comprises a streaming media file header, wherein each byte offset into the first encoded version of the media title corresponds to one or more groups of pictures (GOPs) in the first encoded version of the media title, wherein the plurality of byte offsets specify insertion points within each GOP for interleaving portions of audio data with video data, thereby multiplexing audio with video.

5. The computer-implemented method of claim 4, wherein requesting, by the client device, at least a first streaming media header comprises requesting a plurality of streaming media headers, wherein each streaming media header corresponds to a different encoded version of the media title, that is encoded at a distinct bit rate, wherein the client device is configured to perform a predefined operation in order to seamlessly switch a bit rate at which audiovisual data of the media title is streamed over a data communications network from a media delivery system to the client device.

6. The computer-implemented method of claim 5, wherein the plurality of byte offsets into the first encoded version of the media title correspond to time-aligned portions of the media title across the plurality of streaming media headers, wherein the predefined operation comprises:
    prior to initiating playback of the media title, configuring a decoder on the client device to decode and play back the intervals of audiovisual data, wherein each interval is specified as having a size corresponding to the first encoded version of the media title;
    receiving a plurality of streaming media headers each associated with a corresponding encoded version of the media title, including a streaming media header associated with encoded versions of the media title, at first and second bit rates that are distinct;
    generating, from the plurality of streaming media headers, a playlist information file storing one or more clip information files;
    receiving, over the data communications network, a first interval of the media title from a second encoded version of the media title, wherein the first interval of the media title is encoded at the second bit rate, different from the first bit rate specified for the first interval; and
    padding the first interval from the second encoded version of the media title, such that the size of the padded first interval matches the specified size corresponding to the interval of the media title from the first encoded version of the media title.

7. The computer-implemented method of claim 5, further comprising:
    switching from byte range requests for successive intervals of audiovisual data contained in the first encoded version of the media title, to byte range requests for successive intervals of audiovisual data contained in the second encoded version of the media title, without necessitating any change in interval size and without necessitating any change in interval count, thereby effecting a change in bit rate when streaming the media title, without requiring any decoder reconfiguration to account for a change in interval size, and without requiring any decoder reconfiguration to account for a change in interval count.

8. The computer-implemented method of claim 7, wherein the byte offsets in each encoded version of the media title correspond to one or more groups of pictures (GOPs) in the respective encoded version of the media title;
    wherein each file header specifies a size and a duration for each portion of the audiovisual data present in the corresponding encoding, wherein each clip information file describes one of the portions of audiovisual data to be streamed from the media delivery system, wherein each clip information file, in respective instances:
    (i) stores an indication of the largest encoded size, from the plurality of file headers, for one or more sequential portions of the audiovisual data; and
    (ii) indicates a sequence of one or more groups of pictures (GOPs) in the portion of the audiovisual data corresponding to a respective clip information file.

9. The computer-implemented method of claim 8, wherein generating the plurality of byte range requests comprises:
    determining network bandwidth available to the client device; and
    generating the plurality of byte range requests based at least in part on the determined network bandwidth;
    wherein padding the first portion of the audiovisual data comprises, in respective instances:
    (i) padding at least one GOP in the portion of the audiovisual data such that the size of each GOP matches the size specified in the respective clip information file; and
    (ii) padding the first portion of the audiovisual data comprises adding one or more NULL packets to a transport stream;
    wherein the computer-implemented method further comprises passing the padded first portion of the audiovisual data to the decoder, wherein the decoder decodes the padded first portion of audiovisual data for output to a display device;
    wherein the media delivery system multiplexes an elementary audio stream and an elementary video stream to generate the plurality of portions of audiovisual data streamed to the client device, wherein the client device is one of a Blu-ray® disk player, a set-top box, a digital media content player, and a digital video recorder.

10. A non-transitory computer-readable medium including instructions that, when executed by a processing unit, cause the processing unit to perform an operation to facilitate streaming of audiovisual data, the operation comprising:
    requesting, by a client device, at least a first streaming media header pertaining to a first encoded version of a media title to be streamed to the client device, the first encoded version of the media title containing intervals of audiovisual data, wherein the first streaming media header specifies information about the intervals, the information including: (i) a plurality of byte offsets into the first encoded version of the media title and (ii) corresponding time points in the media title; and
    generating, from the streaming media header and by the client device, a plurality of byte range requests, each corresponding to at least one time point of a respective one of successive intervals selected from the intervals of audiovisual data contained in the first encoded version of the media title.

11. The non-transitory computer-readable medium of claim 10, wherein the operation further comprises:
    streaming the media file to the client device by sending the requests for successive intervals of audiovisual data to a server hosting the media title.

12. The non-transitory computer-readable medium of claim 10, wherein the byte range requests are Hypertext Transfer Protocol (HTTP) byte range requests.

13. The non-transitory computer-readable medium of claim 10, wherein requesting at least a first streaming media header comprises:
   requesting a plurality of streaming media file headers, wherein each streaming media file header corresponds to an encoded version of the media title at a different bit rate.

14. The non-transitory computer-readable medium of claim 13, wherein the plurality of byte offsets into the first encoded version of the media title corresponds to time-aligned portions of the media title across the plurality of streaming media headers.

15. The non-transitory computer-readable medium of claim 14, wherein the operation further comprises:
   switching from byte range requests for successive intervals of audiovisual data contained in the first encoded version of the media title, to byte range requests for successive intervals of audiovisual data contained in the second encoded version of the media title, without necessitating any change in interval size and without necessitating any change in interval count, thereby effecting a change in bit rate when streaming the media title, without requiring any decoder reconfiguration to account for a change in interval size, and without requiring any decoder reconfiguration to account for a change in interval count.

16. The non-transitory computer-readable medium of claim 13, wherein the byte offsets in each encoded version of the media title correspond to one or more groups of pictures (GOPs) in the respective encoded version of the media title.

17. The non-transitory computer-readable medium of claim 13, wherein generating the plurality of byte range requests comprises:
   determining network bandwidth available to the client device; and
   generating the byte range requests based at least in part on the determined network bandwidth.

18. The non-transitory computer-readable medium of claim 10, wherein each byte offset into the first encoded version of the media title corresponds to one or more groups of pictures (GOPs) in the first encoded version of the media title.

19. A system to facilitate streaming of audiovisual data, the system comprising:
   a memory for storing audiovisual data; and
   a processing unit coupled to the memory configured to execute a streaming media client application, wherein the streaming media client application that, when executed, performs an operation comprising:
      requesting, by a client device, at least a first streaming media header pertaining to a first encoded version of a media title to be streamed to the client device, the first encoded version of the media title containing intervals of audiovisual data, wherein the first streaming media header specifies information about the intervals, the information including: (i) a plurality of byte offsets into the first encoded version of the media title and (ii) corresponding time points in the media title; and
      generating, from the streaming media header and by the client device, a plurality of byte range requests, each corresponding to at least one time point of a respective one of successive intervals selected from the intervals of audiovisual data contained in the first encoded version of the media title.

20. The system of claim 19, wherein the operation further comprises:
   streaming the media file to the client device by sending the requests for successive intervals of audiovisual data to a server hosting the media title.

21. The system of claim 19, wherein the byte range requests are Hypertext Transfer Protocol (HTTP) byte range requests.

22. The system of claim 19, wherein requesting at least a first streaming media header comprises:
   requesting a plurality of streaming media file headers, wherein each streaming media file header corresponds to an encoded version of the media title at a different bit rate.

23. The system of claim 22, wherein the plurality of byte offsets into the first encoded version of the media title correspond to time-aligned portions of the media title across the plurality of streaming media headers.

24. The system of claim 23, wherein the operation further comprises:
   switching from byte range requests for successive intervals of audiovisual data contained in the first encoded version of the media title, to byte range requests for successive intervals of audiovisual data contained in the second encoded version of the media title, without necessitating any change in interval size and without necessitating any change in interval count, thereby effecting a change in bit rate when streaming the media title, without requiring any decoder reconfiguration to account for a change in interval size, and without requiring any decoder reconfiguration to account for a change in interval count.

25. The system of claim 22, wherein the byte offsets in each encoded version of the media title correspond to one or more groups of pictures (GOPs) in the respective encoded version of the media title.

26. The system of claim 22, wherein generating the plurality of byte range requests comprises:
   determining network bandwidth available to the client device; and
   generating the byte range requests based at least in part on the determined network bandwidth.

27. The system of claim 19, wherein each byte offset into the first encoded version of the media title corresponds to one or more groups of pictures (GOPs) in the first encoded version of the media title.

28. A computer-implemented method to facilitate streaming of audiovisual data, the computer-implemented method comprising:
   requesting, by a client device, at least a first streaming media header pertaining to a first encoded version of a media title to be streamed to the client device, the first encoded version of the media title containing intervals of audiovisual data, wherein the first streaming media header specifies information about the intervals, the information including a duration and size of each of the intervals the information further including a presentation time and a byte offset of each of the intervals; and
   generating, from the streaming media file header and by the client device, a plurality of byte range requests, each corresponding to at least one presentation time of a respective one of successive intervals selected from the intervals of audiovisual data contained in the first encoded version of the media title.

29. The computer-implemented method of claim 28, wherein requesting at least a first streaming media header comprises requesting a plurality of streaming media headers, wherein each streaming media header corresponds to a respective encoded version of the media title at a different bit rate.

30. The computer-implemented method of claim 29, wherein the plurality of byte offsets into the first encoded version of the media title correspond to time-aligned portions of the media title across the plurality of streaming media headers.

31. The computer-implemented method of claim 29, further comprising:
   switching from byte range requests for successive intervals of audiovisual data contained in the first encoded version of the media title, to byte range requests for successive intervals of audiovisual data contained in the second encoded version of the media title, without necessitating any change in interval size and without necessitating any change in interval count, thereby effecting a change in bit rate when streaming the media title, without requiring any decoder reconfiguration to account for a change in interval size, and without requiring any decoder reconfiguration to account for a change in interval count.

\* \* \* \* \*